US008420241B2

(12) United States Patent
Andou et al.

(10) Patent No.: US 8,420,241 B2
(45) Date of Patent: Apr. 16, 2013

(54) SEALED CELL

(75) Inventors: Kazushi Andou, Tokushima (JP); Shuichi Yamashita, Tokushima (JP)

(73) Assignee: SANYO Electric Co., Ltd., Moriguch-shi (JP)

( * ) Notice: Subject to any disclaimer, the term of this patent is extended or adjusted under 35 U.S.C. 154(b) by 284 days.

(21) Appl. No.: 12/732,619

(22) Filed: Mar. 26, 2010

(65) Prior Publication Data

US 2010/0247985 A1    Sep. 30, 2010

(30) Foreign Application Priority Data

Mar. 26, 2009   (JP) .................................. 2009-76955

(51) Int. Cl.
*H01M 2/12* (2006.01)
*H01M 2/04* (2006.01)
*H01M 10/52* (2006.01)

(52) U.S. Cl.
USPC ............................... 429/56; 429/53; 429/175

(58) Field of Classification Search .............. 429/53–56, 429/175
See application file for complete search history.

(56) References Cited

U.S. PATENT DOCUMENTS 5,609,972 A * 3/1997 Kaschmitter et al. ............ 429/56
2006/0275657 A1 * 12/2006 Kozuki et al. ................. 429/185
2007/0172728 A1 * 7/2007 Yamashita et al. ............. 429/174

FOREIGN PATENT DOCUMENTS

JP           5-74904 B2      10/1993

* cited by examiner

*Primary Examiner* — Gregg Cantelmo
(74) *Attorney, Agent, or Firm* — Westerman, Hattori, Daniels & Adrian, LLP

(57) ABSTRACT

A sealed cell includes a sealing body that includes an iron-based terminal cap and an aluminum-based safety valve. The terminal cap includes an external terminal, a flange in a periphery of the external terminal, and a hole in the flange. The hole has a diameter smaller on an inner side than on an outer side of the sealed cell. The safety valve includes a conductive contact portion projecting toward an inside of the sealed cell, a peripheral portion in a periphery of the conductive contact portion, and a pin projection in the peripheral. The sealed cell has a riveted portion in which the pin projection and the hole of the terminal cap together are riveted by inserting the pin projection into the hole and crushing a tip of the pin projection. A diameter of the terminal cap is larger than a diameter of the safety valve.

9 Claims, 7 Drawing Sheets

SEALED CELL

BACKGROUND OF THE INVENTION

1. Field of the Invention

The present invention relates to a sealed cell, and more specifically, to the improvement of a sealing body with a safety valve in the sealed cell.

2. Background Art

Non-aqueous electrolyte secondary cells are widely used as the driving power sources of portable devices and electric tools because of their high energy density and high capacity.

These cells using flammable organic solvents are required to ensure safety, and for this reason, the sealing body for sealing such a cell includes a current breaking mechanism and a gas releasing mechanism, which operates when the cell internal pressure increases.

FIG. 1 shows a sealed cell having a sealing body including a current breaking mechanism. The sealing body 10 includes a terminal cap 5, a safety valve 3 disposed on the inner surface of the terminal cap 5, a terminal plate 1 disposed on the inner surface of the safety valve 3, and an insulating member 2 providing isolation and insulation between the safety valve 3 and the terminal plate 1. In order to keep the conductive contact between the cap terminal 5 and the safety valve 3, pin-like projections 3c provided on a periphery portion 3b of the safety valve are inserted into counterbored holes 5c formed in a flange portion 5b of the terminal cap. Then, the terminal cap and the safety valve are riveted and fixed. In addition, a convex is formed toward the inside of the cells near the center of the safety valve 3, and an area near the top of the convex (a conductive contact portion) is welded to the terminal plate 1. A break groove, a thin portion of the terminal plate 1, is formed on the terminal plate 1 at the periphery of the area welded to the conductive contact portion.

The current breaking mechanism of the sealed cell operates as follows. When the cell internal pressure increases, the safety valve 3 is pushed up toward the outside of the cell. This results in the breakage of the break groove of the terminal plate 1, which is connected to a conductive contact portion 3a of the safety valve 3, thereby interrupting current supply to the terminal cap 5.

In such a current breaking mechanism, the safety valve is required to be made of a material susceptible to deformation so that the above-described operation can be performed smoothly. The terminal cap, on the other hand, is required to be made of a material having a certain strength because it is exposed to the external environment. To satisfy these requirements, the safety valve is made of a flexible aluminum-based material, and the terminal cap is made of a rigid iron-based material.

In non-aqueous electrolyte secondary cells that are designed to provide large current discharge performance in electric tools and similar devices, the cell temperature may be heated up to 80° C. or more during discharge. When the cells are repeatedly exposed to high temperatures during long-term use, resin components such as the insulating member 2 and a gasket 30 become less flexible. This reduces the contact between the terminal cap 5 and the safety valve 3 in the vicinity of the resin components. As a result, the conduction therebetween becomes unstable, thereby tending to increase the internal resistance of the cell. For this reason, it is desired to firmly join the terminal cap 5 and the safety valve 3.

Well-known techniques on the sealing body include the following Patent Document 1.

Patent Document 1: Japanese Patent Examined Publication No. H05-74904

Patent Document 1 discloses a sealing body including the following cell cap and metal plate. The cell cap includes a cylindrical portion and a flange that is formed on the outer periphery of the cylindrical portion and has a plurality of holes. The metal plate includes a plurality of projections whose height is larger than the thickness of the cell cap. The projections of the metal plate are inserted into the holes of the cell cap, and each part of the projections that protrudes from the holes is pressure-welded. Thereby, the cell cap and the metal plate are fixed.

According to this technique, a sealing body that excels in anchorage strength and assembly accuracy. However, this technology does not review that the safety valve is apt to deform, and thus does not provide a sufficient conductivity of the sealing body.

SUMMARY OF THE INVENTION

The present invention aims at resolving the above problems. Therefore, the object of the present invention is to provide a sealed cell including a sealing body with a safety valve excellent in conductivity.

A sealed cell according to the first aspect of the present invention comprises:
 a bottomed cylindrical outer can; and
 a sealing body sealed by caulking around an opening of the outer can,
 wherein
 the sealing body includes:
 a terminal cap made of an iron-base material, the terminal cap including an external terminal projecting toward an outside of the sealed cell, a flange in a periphery of the external terminal, and a hole in the flange, the hole having a diameter smaller on an inner side than on an outer side of the sealed cell; and
 a safety valve made of an aluminum-based material, the safety valve including a conductive contact portion projecting toward an inside of the sealed cell, a peripheral portion in a periphery of the conductive contact portion, and a pin-like projection in the peripheral portion,
 wherein:
 the sealed cell has a riveted portion in which the pin-like projection of the safety valve and the hole of the terminal cap together are riveted by inserting the pin-like projection into the hole and crushing a tip of the pin-like projection; and
 a diameter of the terminal cap is larger than a diameter of the safety valve.

We, the present inventors have diligently researched the improvement in the sealing performance of the sealing body. As a result, we have found that the following problem occurs when caulking the sealing body, in which the safety valve made of an aluminium-based material that is apt to deform and the terminal cap made of a rigid iron-based material are riveted, around an opening of the bottomed cylindrical outer can.

The sealing body is formed by integrating the safety valve and the terminal cap that consist of two different materials. Therefore, as described above, when the sealing body is caulked and fixed around the opening of the outer can 20 via the gasket 30, the periphery 3b of the safety valve and the flange 5b of the terminal cap are pressed by the gasket 30, and further they are subjected to a deforming force due to bending the opening of the outer can 20 toward the terminal cap 5. Thus, the periphery 3b and the flange 5b are also subjected to the force in the perpendicular direction. Although the periphery 3b and the flange 5b are deformed due to the above force, the deformation degrees are not the same because of the difference between their properties. Therefore, when the diameter of the safety valve 3 that is easy to deform is equal to or larger than that of the terminal cap that is hard to deform (cf. FIG. 7A), a looseness or a gap occurs at or around the riveted portion due to the caulking force and the difference of the deformation degree (cf. FIG. 7B). This looseness or gap destabilizes the contact between the safety valve and the terminal cap, and thus the conductivity therebetween also becomes unstable.

However, when the diameter of the terminal cap is larger than that of the safety valve (cf. FIG. 6A) as presented in the above first aspect of the present invention, because this difference of the diameters eases the difference of the deformation degrees at the time of caulking, there is little possibility that a gap occurs between the safety valve and the terminal cap (cf. FIG. 6B). For this reason, a good contact between the safety valve and the terminal cap is kept and thus high conductivity is maintained.

A sealed cell according to the second aspect of the present comprises:

a bottomed cylindrical outer can; and
a sealing body sealed by caulking around an opening of the outer can,
wherein
the sealing body includes:
a terminal cap made of an iron-base material, the terminal cap including an external terminal projecting toward an outside of the sealed cell, a flange in a periphery of the external terminal, and a hole in the flange, the hole having a diameter smaller on an inner side than on an outer side of the sealed cell); and
a safety valve made of an aluminum-based material, the safety valve including a conductive contact portion projecting toward an inside of the sealed cell, a peripheral portion in a periphery of the conductive contact portion, and a pin-like projection in the peripheral portion,
wherein:
the sealed cell has a riveted portion in which the pin-like projection of the safety valve and the hole of the terminal cap together are riveted by inserting the pin-like projection into the hole and crushing a tip of the pin-like projection; and
an outer circumference of the safety valve is located more inside than an outer circumference of the terminal cap in a planar view of the sealed cell.

When an outer circumference of the safety valve is located more inside than that of the terminal cap, which is stated in the above second aspect, the same effect as that in the first aspect is also provided.

In the above configuration according to the first aspect of the present invention, it is preferred that the diameter of the terminal cap 5 is from 0.04 mm to 0.1 mm larger than the diameter of the safety valve 3.

Additionally, in the above configuration according to the second aspect of the present invention, it is preferred that the outer circumference of the safety valve 3 is located from 0.04 mm to 0.1 mm more inside than an outer circumference of the terminal cap 5.

Herein, the term "iron-based material" includes iron and iron alloys, and the term "aluminium-based material" includes pure aluminium and aluminium alloys.

BRIEF DESCRIPTION OF THE DRAWING

FIG. 6A shows a view before caulking, and FIG. 6B shows a view after caulking.

FIG. 7A shows a view before caulking, and FIG. 7B shows a view after caulking.

DETAILED DESCRIPTION OF THE INVENTION EMBODIMENT

Figure 1:
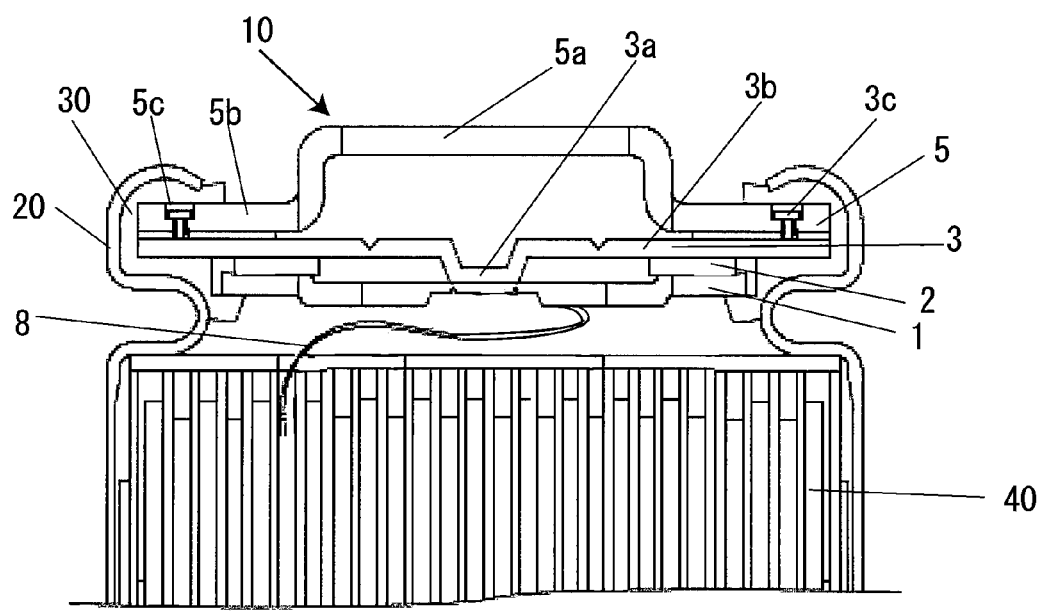
FIG. 1 is a sectional view of a sealed cell according to the present invention.

An embodiment of the present invention will be described as follows with reference to drawings. FIG. 1 is a sectional view enlarging a main part of the sealed cell according to the present invention.

As shown in FIG. 1, the sealed cell according to Embodiment has a configuration in which the sealing body is deposited and sealed by caulking around the opening of the outer can 20 housing the electrode assembly 40 and a non-aqueous electrolyte. In addition, as shown in FIG. 1, the sealing body 10 of the sealed cell according to Embodiment includes a terminal plate 1, a terminal cap 5, a safety valve 3, and an insulating member 2. The terminal plate 1 is electrically connected to either the positive or negative electrode of the electrode assembly 40 via an electrode tab 8. The terminal cap 5 includes an external terminal 5a projecting toward the outside of the cell. The safety valve 3 is disposed between the terminal plate 1 and the terminal cap 5 and cuts off the electric connection therebetween by being deformed when the cell internal pressure increases. The insulating member 2 prevents the electric contact between the safety valve 3 and the terminal plate 1 when the safety valve 3 interrupts the electrical current.

Figure 2A:
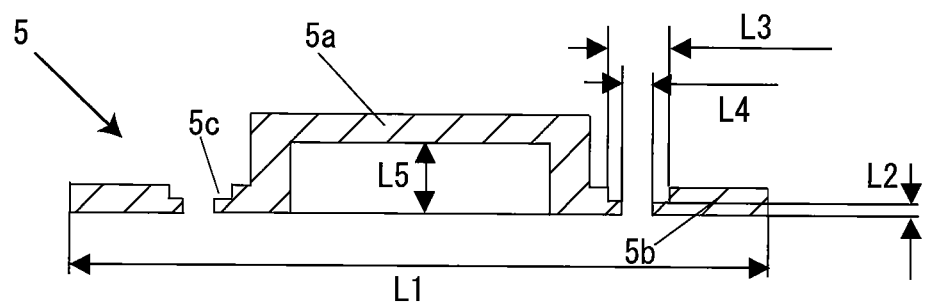
FIGS. 2A and 2B show a terminal cap and a safety valve of a sealing body used in the sealed cell according to the present invention, respectively.
Figure 2B:
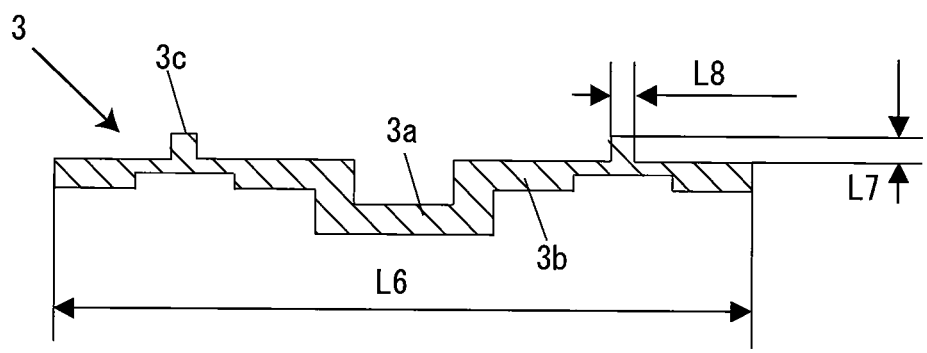

The terminal cap 5 and the safety valve 3 according to the present invention are shown in FIGS. 2A and 2B. As shown in FIG. 2A, the terminal cap 5 includes an external terminal 5a projecting toward an outside of the sealed cell, a flange portion 5b in a periphery of the external terminal, and counterbored holes 5c formed in the flange portion 5b. As shown in FIG. 2B, the safety valve 3 includes a conductive contact portion 3a projecting toward an inside of the sealed cell, a peripheral portion 3b in a periphery of the conductive contact portion 3a, and pin-like projections 3c provided in peripheral portion 3b. As shown in FIG. 3C, the pin-like projections 3c are inserted into the counterbored holes 5c, and then the tips of the pin-like projections 3c are crushed to rivet the safety valve 3 and the terminal cap 5. The diameter L1 of the terminal cap 5 and the diameter L6 of the safety valve 3 are 16.5 mm and 16.4 mm, respectively.

A method for producing a lithium ion secondary cell having the above structure is explained below.

<Preparation of the Positive Electrode>

Lithium cobalt oxide ($LiCoO_2$) as a positive electrode active material, a carbon-based conductive agent such as acetylene black, graphite, or the like, and polyvinylidene fluoride (PVDF) as a binder were weighed in a mass ratio of 90:5:5, dissolved, for example, in N-methyl-2-pyrrolidone as an organic solvent, and mixed together to prepare a positive electrode active material slurry.

The slurry was uniformly applied to both sides of a positive electrode core body made of 20 μm thick aluminum foil using a die coater, a doctor blade, or the like.

The electrode plate thus obtained was put in a dryer to remove the organic solvent so as to produce a dried electrode plate. The dried electrode plate was rolled by a roll press machine, cut in size so as to produce a positive electrode.

Examples of the positive electrode active material include lithium-containing transition metal composite oxides, which can be used alone or in combination of two or more thereof. Examples of the lithium-containing transition metal composite oxides include lithium cobalt oxide used in the above-described embodiment, lithium nickel oxide ($LiNiO_2$), lithium manganese oxide ($LiMn_2O_4$), lithium iron phosphate ($LiFePO_4$), lithium-manganese-nickel-cobalt oxide ($LiMn_xNi_yCo_zO_2$ wherein x+y+z=1), and other oxides obtained by replacing part of a transition metal by another element.

<Preparation of the Negative Electrode>

Artificial graphite as a negative electrode active material, styrene-butadiene rubber as a binder, and carboxymethylcellulose as a viscosity improver were weighed in a mass ratio of 98:1:1, mixed with an appropriate amount of water so as to prepare a negative electrode active material slurry.

The slurry was uniformly applied to both sides of a negative electrode core body made of 15 μm thick copper foil using a die coater, a doctor blade, or the like.

The electrode plate thus obtained was put in a dryer to remove water so as to produce a dried electrode plate. The dried electrode plate was rolled by a roll press machine, cut in size so as to produce a negative electrode.

Examples of the negative electrode material include carbonaceous materials and mixtures of a carbonaceous material and at least one selected from the group consisting of lithium, a lithium alloy, and a metal oxide capable of absorbing and desorbing lithium. Examples of the carbonaceous materials include natural graphite, carbon black, coke, glassy carbons, carbon fibers, and sintered bodies thereof.

<Production of the Electrode Assembly>

The positive and negative electrodes thus produced were wound together with a separator made of a polyethylene microporous film by a winder, and applied with an insulating winding-end tape so as to complete a wound electrode assembly.

<Production of the Sealing Body>

(Production of the Terminal Cap)

Figure 4A:
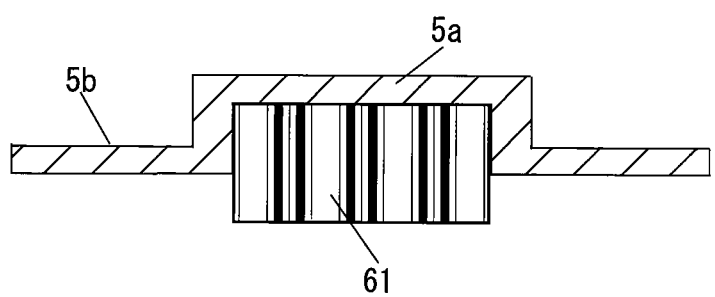
FIGS. 4A to 4D describe a process for producing the terminal cap of the sealed cell according to the present invention.

A nickel-plated iron plate was pressed in its center by a press die 61 so as to form an external terminal (a projection) 5a (cf. FIG. 4A).

Figure 4B:
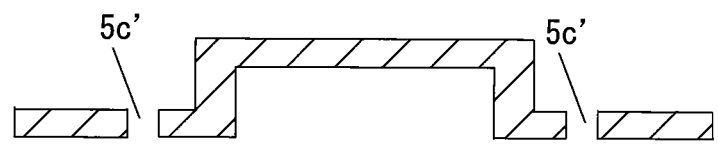

Then, the flange 5b (the outer periphery of the projection) was provided with perforated holes 5c', 5c' (cf. FIG. 4B).

Figure 4C:
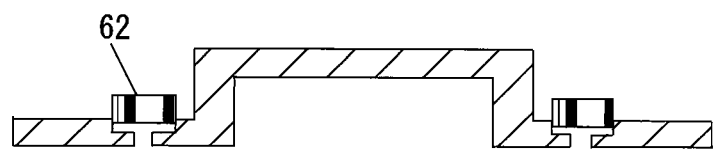

The holes 5c', 5c' were pressed from above by a press die 62 so as to partially increase their diameter (cf. FIG. 4C). At this moment, the diameter of the opposite side (the bottom side) of the holes becomes smaller than the state (cf. FIG. 4B).

Figure 4D:
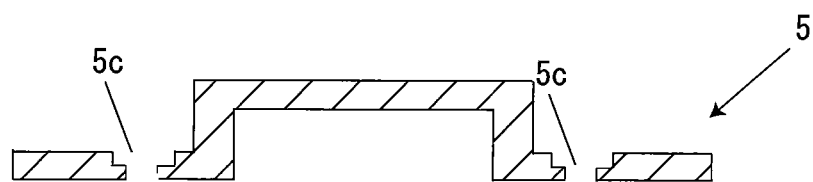

Then, the holes were punched again to increase the diameter of their bottom side (cf. FIG. 4D), which had been reduced due to the press.

Finally, the iron plate was punched out into a disk with 16.5 mm diameter so as to complete the terminal cap 5 having counterbored holes 5c.

(Production of the Safety Valve)

Figure 5A:
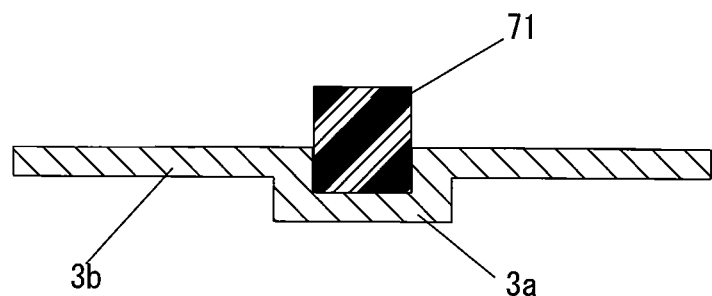
FIGS. 5A and 5C describe a process for producing the safety valve of the sealed cell according to the present invention.
Figure 5B:
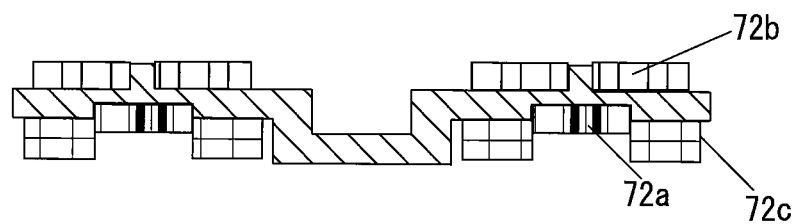
Figure 5C:
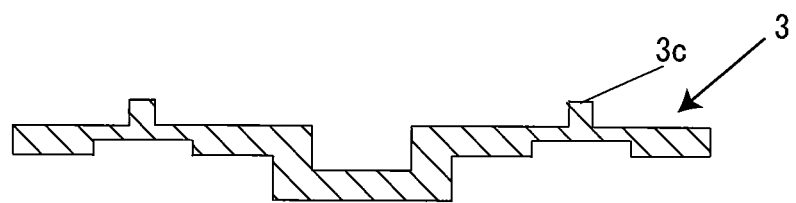

An aluminum plate was pressed in its center by a press die 71 so as to form a conductive contact portion (a recess) 3a as shown in FIG. 5A. Then, the peripheral portion 3b (the outer periphery of the recess) was pushed from the bottom by press dies 72a, 72b, and 72c so as to form projections (cf. FIG. 5B). Finally, the aluminum plate was punched out into a disk with 16.4 mm diameter so as to complete the safety valve 3 having pin-like projections 3c (cf. FIG. 5C).

In this production method, hollowed portions are formed on the side opposite to the pin-like projections 3c on the aluminum plate as a result of deformation due to pressing (cf. FIG. 5C); however, these portions are not essential components of the present invention.

In Embodiment of the present invention, components of the sealed cell have the following dimensions. The terminal cap 5 has a diameter L1 of 16.5 mm and a thickness of 0.3 mm. The counterbored holes 5c have a diameter L3 of 1.4 mm in the large-diameter portion, a diameter L4 of 1.0 mm in the small-diameter portion, and a height L2 of 0.2 mm in the small-diameter portion. The height L5 of the terminal cap is 1.8 mm. The safety valve 3 has a diameter L6 of 16.4 mm and a thickness of 0.4 mm. The pin-like projections 3c have a height L7 of 0.5 mm and a diameter L8 of 0.9 mm.

The safety valve 3 has three pin-like projections 3c, and the terminal cap 5 has three counterbored holes 5c.

<Riveting Step>

Figure 3A:
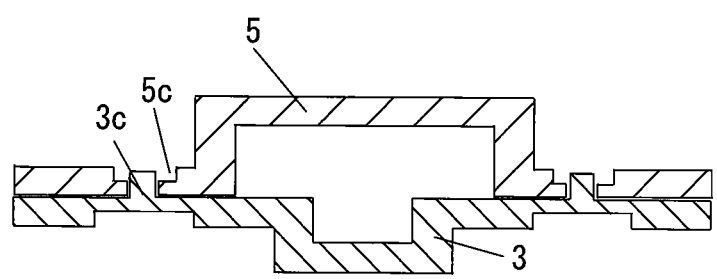
FIGS. 3A to 3C describe a process for fixing together the terminal cap and the safety valve by rivets.

The terminal cap 5 was placed on the upper surface of the safety valve 3 in such a manner that the pin-like projections 3c of the safety valve 3 were inserted into the counterbored holes 5c of the terminal cap 5 (cf. FIG. 3A).

Figure 3B:
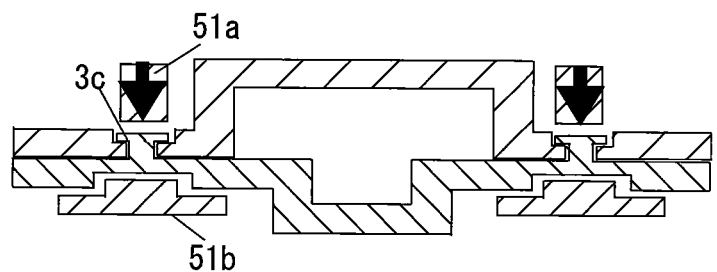
Figure 3C:
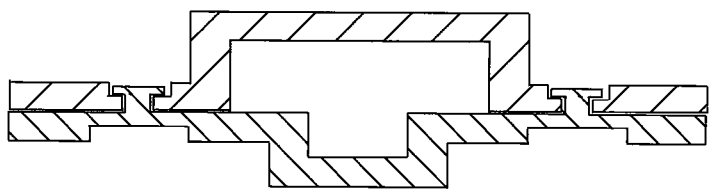

Next, the tips of the pin-like projections 3c were pressed from above and below and crushed by rivet fasteners 51a and 51b so as to form riveted portions, thus riveting the safety valve 3 and the terminal cap 5 together (cf. FIGS. 3B and 3C).

Finally, the aluminum terminal plate 1 was welded to the bottom surface of the safety valve 3 via the polypropylene insulating member 2 so as to complete the sealing body 10.

<Preparation of the Electrolytic Solution>

An electrolytic solution was produced by forming a non-aqueous solvent containing ethylene carbonate (EC), propylene carbonate (PC), and diethyl carbonate (DEC) in a volume ratio of 1:1:8 (in terms of 1 atm at 25° C.), and then dissolving $LiPF_6$ as an electrolyte salt at 1.0 M (mol/L) into this non-aqueous solvent.

Besides the aforementioned combination of EC, PC, and DEC, the non-aqueous solvent can be a mixture of one or more high dielectric solvent having a high solubility of lithium salt and one or more low-viscosity solvent.

Examples of the high dielectric solvent include ethylene carbonate, propylene carbonate, butylene carbonate, and γ-butyrolactone. Examples of the low-viscosity solvent include diethyl carbonate, dimethyl carbonate, ethyl methyl carbonate, 1,2-dimethoxyethane, tetrahydrofuran, anisole, 1,4-dioxane, 4-methyl-2-pentanone, cyclohexanone, acetonitrile, propionitrile, dimethylformamide, sulfolane, methyl formate, ethyl formate, methyl acetate, ethyl acetate, propyl acetate, and ethyl propionate.

In addition, besides $LiPF_6$ used in the embodiment, examples of the electrolyte salt include LiN $(C_2F_5SO_2)_2$, LiN $(CF_3SO_2)_2$, $LiClO_4$ and $LiBF_4$ all of which can be used alone or in combination of two or more.

<Assembly of the Cell>

A negative electrode current collector of the electrode assembly was welded to the bottom of a cylindrical outer can, and the outer can was filled with the electrolytic solution. The terminal plate 1 of the sealing body 10 and a positive electrode current collector of the electrode assembly 40 were electrically connected via the electrode tab 8. Finally, the opening of the outer can was caulked and sealed via the polypropylene gasket 30 so as to complete the cell according to Embodiment of the present invention.

Example 1

Cells according to Example 1 were manufactured in the same manner as in the above Embodiment. Three pin-like projections of the safety valve and three holes of the terminal cap were formed.

Comparative Example 1

Cells according to Comparative Example 1 were manufactured in the same manner as in Example 1 except that the diameter of the terminal cap is the same as that of the safety valve (16.5 mm). Three pin-like projections of the safety valve and three holes of the terminal cap were formed.
<Measurement of the Resistance>

Thirty cells were manufactured as each of Example 1 and Comparative Example 1. The sealing bodies of these cells were measured for their electric resistance after riveting and after caulking. The results are shown in Table 1 below.

TABLE 1

|  | Electrical resistance (mΩ) | |
| --- | --- | --- |
|  | After riveting | After caulking |
| Example 1 | 0.1 | 2.1-2.8 |
| Comparative Example 1 | 0.1 | 10.1-27.5 |

The results in Table 1 indicate the following. In Example 1 in which the diameter of the terminal cap is larger than that of the safety valve, the electrical resistance after caulking is from 2.1 to 2.8 mΩ. On the other hand, in Comparative Example 1 in which the diameter of the terminal cap is the same as that of the safety valve, the electrical resistance after caulking is from 10.1 to 27.5 mΩ, which indicates that both the resistance and its variation are significantly large.

Figure 7A:
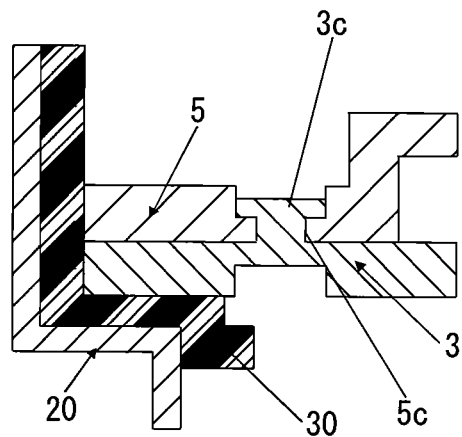
FIGS. 7A and 7B are sectional views of the riveted portion in a conventional cell.
Figure 7B:
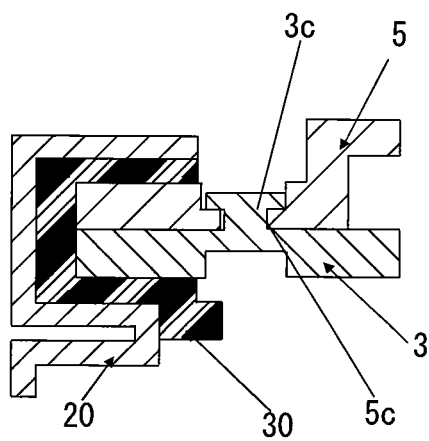

The reasons for these results are considered as follows. In both Example 1 and Comparative Example 1, the safety valve is made of aluminium-based material that is apt to deform, and the terminal cap is made of rigid iron-based material. Therefore, when the sealing body, which consists of two different materials, is caulked and fixed around the opening of the outer can 20 via the gasket 30, the periphery 3b of the safety valve 3 and the flange 5b of the terminal cap 5 are pressed by the gasket 30, and further they are subjected to a deforming force due to bending the opening of the outer can 20 toward the terminal cap 5. In other words, the periphery 3b and the flange 5b are also subjected to the force in the perpendicular direction. Although the periphery 3b and the flange 5b are deformed due to the above force, the deformation degrees are different between the periphery 3b and the flange 5b because of the difference between their properties. In Comparative Example 1 (cf. FIG. 7A) in which the diameter of the safety valve that is apt to deform is the same as that of the terminal cap that is hard to deform (rigid), a looseness or a gap occurs at or around the riveted portion due to the caulking force and the difference of the deformation degrees (cf. FIG. 7B). This looseness or gap destabilizes the contact between the safety valve and the terminal cap, and thus their conductivity also becomes unstable.

Figure 6A:
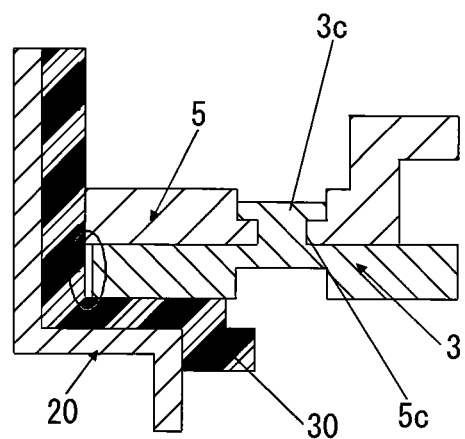
FIGS. 6A and 6B are sectional views of the riveted portion in the sealed cell according to the present invention.
Figure 6B:
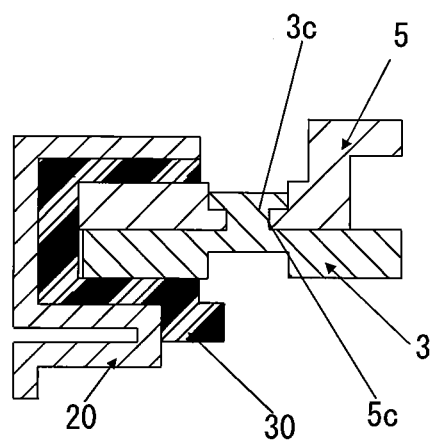

On the other hand, in Example 1, the diameter of the terminal cap 5 is larger than that of the safety valve (cf. FIG. 6A), because this difference of the diameters eases the difference of the deformation degrees at the time of caulking, there is little possibility that a gap occurs between the safety valve and the terminal cap (cf. FIG. 6B). For this reason, a good contact between the safety valve and the terminal cap is kept and thus their conductivity is enhanced.

As described hereinbefore, the present invention provides a highly conductive sealing body with a safety valve, allowing a sealed cell including this sealing body to have high current extraction efficiency, thereby providing high industrial applicability.

What is claimed is:

1. A sealed cell comprising:
a bottomed cylindrical outer can; and
a sealing body sealed by caulking around an opening of the outer can, wherein the sealing body includes:
a terminal cap including an external terminal projecting toward an outside of the sealed cell, a flange in a periphery of the external terminal, and a hole formed in the flange, the hole having a diameter smaller on an inner side than on an outer side of the sealed cell; and
a safety valve including a conductive contact portion projecting toward an inside of the sealed cell, a peripheral portion in a periphery of the conductive contact portion, and a pin-shaped projection in the peripheral portion,
wherein
the sealed cell has a riveted portion in which the pin-shaped projection of the safety valve and the hole of the terminal cap together are riveted by inserting the pin-shaped projection into the hole and crushing a tip of the pin-shaped projection; and
a diameter of the terminal cap is larger than a diameter of the safety valve.

2. The sealed cell of claim 1, wherein the diameter of the terminal cap is from 0.04 mm to 0.1 mm larger than the diameter of the safety valve.

3. A sealed cell comprising:
a bottomed cylindrical outer can; and
a sealing body sealed by caulking around an opening of the outer can, wherein
the sealing body includes:
a terminal cap including an external terminal projecting toward an outside of the sealed cell, a flange in a periphery of the external terminal, and a hole formed in the flange, the hole having a diameter smaller on an inner side than on an outer side of the sealed cell; and
a safety valve including a conductive contact portion projecting toward an inside of the sealed cell, a peripheral portion in a periphery of the conductive contact portion, and a pin-shaped projection in the peripheral portion,
wherein
the sealed cell has a riveted portion in which the pin-shaped projection of the safety valve and the hole of the terminal cap together are riveted by inserting the pin-shaped projection into the hole and crushing a tip of the pin-shaped projection; and
an outer circumference of the safety valve is located more inside than an outer circumference of the terminal cap in a planar view of the sealed cell.

4. The sealed cell of claim 3, wherein the outer circumference of the safety valve is located from 0.04 mm to 0.1 mm more inside than the outer circumference of the terminal cap.

5. The sealed cell of claim 1, wherein the safety valve is made of aluminum or aluminum alloys, and the terminal cap is made of iron or iron alloys.

6. The sealed cell of claim 3, wherein the safety valve is made of aluminum or aluminum alloys, and the terminal cap is made of iron or iron alloys.

7. The sealed cell of claim 1, wherein the material of the safety valve is more apt to deform than the material of the terminal cap.

8. The sealed cell of claim 3, wherein the material of the safety valve is more apt to deform than the material of the terminal cap.

9. A sealed cell comprising:
- a bottomed cylindrical outer can; and
- a sealing body sealed by caulking around an opening of the outer can, wherein the sealing body includes:
- a terminal cap including an external terminal projecting toward an outside of the sealed cell, a flange in a periphery of the external terminal, and a hole formed in the flange, the hole having a diameter smaller on an inner side than on an outer side of the sealed cell; and
- a safety valve including a conductive contact portion projecting toward an inside of the sealed cell, a peripheral portion in a periphery of the conductive contact portion, and a pin-shaped projection in the peripheral portion, wherein
- the sealed cell has a riveted portion in which the pin-shaped projection of the safety valve and the hole of the terminal cap together are riveted by inserting the pin-shaped projection into the hole and crushing a tip of the pin-shaped projection;
- wherein the diameter of the terminal cap is sufficiently larger than the diameter of the safety valve such that when caulking the sealing body to the outer can after riveting the pin-shaped projection of the safety valve and the hole of the terminal cap, a gap between the pin-shaped projection and the hole is prevented from forming due to the difference in diameter between the terminal cap and the diameter of the safety valve.

* * * * *